(12) United States Patent
Erickson

(10) Patent No.: US 8,490,427 B2
(45) Date of Patent: Jul. 23, 2013

(54) LIQUID DESICCANT CHILLER

(76) Inventor: Donald Charles Erickson, Annapolis, MD (US)

(*) Notice: Subject to any disclaimer, the term of this patent is extended or adjusted under 35 U.S.C. 154(b) by 910 days.

(21) Appl. No.: 12/592,483

(22) Filed: Nov. 25, 2009

(65) Prior Publication Data

US 2010/0275629 A1 Nov. 4, 2010

Related U.S. Application Data

(60) Provisional application No. 61/200,228, filed on Nov. 25, 2008.

(51) Int. Cl.
*F25D 23/00* (2006.01)

(52) U.S. Cl.
USPC .......................................................... 62/271

(58) Field of Classification Search
USPC ................... 62/271, 272, 304, 310, 324.5
See application file for complete search history.

(56) References Cited

U.S. PATENT DOCUMENTS

| | | |
|---|---|---|
| 3,417,574 A | 12/1968 | Kelley |
| 4,171,624 A | 10/1979 | Meckler |
| 4,205,529 A | 6/1980 | Ko |
| 4,373,347 A | 2/1983 | Howell |
| 4,939,906 A * | 7/1990 | Spatz et al. ............... 62/94 |
| 4,941,324 A | 7/1990 | Peterson |
| 5,070,703 A | 12/1991 | Wilkinson |
| 5,966,955 A | 10/1999 | Maeda |
| 6,216,483 B1 | 4/2001 | Potnis |
| 7,260,945 B2 * | 8/2007 | Landry ..................... 62/94 |
| 7,354,101 B2 * | 4/2008 | Donabedian et al. .... 296/193.11 |

OTHER PUBLICATIONS

Khaled Gommed and Gershon Grossman. "Experimental Investigation of a Solar-Powered Open Absorption System for Cooling, Dehumidification and Air Conditioning." International Sorption Heat Pump Conference. Sep. 23, 2008. Seoul, Korea.
Benjamin Marcus Jones. "Field Evaluation and Analysis of a Liquid Desiccant Air Handling System." Queen's University. Sep. 2008. Kingston, Ontario, Canada.
Jianhua Liu; et al. "Experimental Investigation on the Operation Performance of a Liquid Desiccant Air-Conditioning System." HVAC Technologies for Energy Efficiency. vol. IV-11-5. 2006.
Andrew Lowenstein; et al. "A Low-Flow, Zero Carryover Liquid Desiccant Conditioner." International Sorption Heat Pump Conference. Jun. 22, 2005. Denver, Colorado.
Andrew Lowenstein. "A Solar Liquid-Desiccant Air Conditioner." Solar LDAC. Mar. 2003.
Andrew Lowenstein, Ph.D. and Davor Novosel. "The Seasonal Performance of a Liquid-Desiccant Air Conditioner." ASHRAE Technical Data Bulletin. vol. II, No. 2. 1995.
Ahmad Pesaran, Ph.D., et al. "Evaluation of a Liquid Desiccant-Enhanced Heat Pipe Air Preconditioner." ASHRAE Technical Data Bulletin. vol. II, No. 2. 1995.

(Continued)

*Primary Examiner* — Melvin Jones

(57) ABSTRACT

A thermally activated air conditioning system is disclosed that both dries and chills the air being conditioned. Drying is by a liquid desiccant subsystem, and chilling is by an absorption chilling subsystem. A very high COP (1.25) is obtainable owing to the use of reject heat from the absorption subsystem to power the desiccant subsystem. The overall system (or cycle) is powered by relatively low temperature input heat (e.g. 245° F.). That heat can be obtained from flat plate or evacuated tube solar collectors, or other sources. The low driving temperature is made possible by the disclosed integration between the two subcycles.

20 Claims, 11 Drawing Sheets

OTHER PUBLICATIONS

Edward N. Schinner, Jr, P.E. "Performance Analysis of a Combined Desiccant/Absorption Air-Conditioning System." HVAC & R Research. vol. 5, No. 1. Jan. 1999.

W. H. Wilkinson, P.E. "A Simplified High Efficiency Dublsorb System." ASHRAE Transcations: Symposia. NY-91-2-1. 1991.

W. H. Wilkinson, P.E. "Evaporative Cooling Trade-Offs in Liquid Desiccant Systems." ASHRAE Transcations: Symposia. NY-91-8-2. 1991. pp. 642-649.

* cited by examiner

Fig. 7

| State Point | t[i] [°C] | tf[i] | p[i] [-] | h[i] [kJ/kg] | tib[i] [C] | v[i] [m^3/kg] | w[i] [-] | rh[i] [-] | m[i] [kg/sec] |
|---|---|---|---|---|---|---|---|---|---|
| 27 |  |  |  |  |  |  |  |  | 0.004186 |
| 30 | 26.667 | 80 | 0.01789 | 55.567 | 19.44 | 0.86748 | 0.01127 | 0.5118 | 3.689381 |
| 31 | 23.763 | 74.77 | 0.01968 | 55.504 | 19.4 |  | 0.01242 | 0.6691 | 3.693567 |
| 32 | 31.101 | 87.98 | 0.01968 | 63.057 | 21.62 | 0.88191 | 0.01242 | 0.4355 | 3.693567 |
| 36 | 31.101 | 87.98 | 0.01968 | 63.057 | 21.62 | 0.88191 | 0.01242 | 0.4355 | 3.693567 |
| 37 | 35 | 95 | 0.01285 | 55.873 | 19.62 |  | 0.00805 | 0.2285 | 3.677639 |
| 38 | 35.694 | 96.25 | 0.01163 | 54.606 | 19.25 | 0.88798 | 0.00728 | 0.1991 | 3.677639 |
| 39 | 27.667 | 81.8 | 0.01285 | 48.384 | 17.22 | 0.86595 | 0.00805 | 0.3466 | 3.677639 |
| 40 | 18.333 | 65 | 0.01285 | 38.852 | 13.81 | 0.83909 | 0.00805 | 0.6098 | 3.677639 |
| 45 | 35 | 95 | 0.02244 | 71.644 | 23.89 | 0.89572 | 0.0142 | 0.3991 | 2.590117 |
| 46 | 53.572 | 128.4 | 0.02244 | 90.814 | 28.39 |  | 0.0142 | 0.1527 | 2.590117 |
| 47 | 56.546 | 133.8 | 0.03365 | 112.98 | 32.55 | 0.9694 | 0.02154 | 0.1986 | 2.606045 |
| 48 | 56.104 | 133 | 0.03199 | 109.655 | 31.97 |  | 0.02044 | 0.1928 | 2.606045 |
| 49 | 37.842 | 100.1 | 0.03199 | 90.603 | 28.19 |  | 0.02044 | 0.4869 | 2.606045 |
| 60 | 35.694 | 96.25 | 1.175 | 79.67 |  |  |  |  | 2.795748 |
| 61 | 35.694 | 96.25 | 1.175 | 79.67 |  |  |  |  | 1.929391 |
| 62 | 35.694 | 96.25 | 1.175 | 79.67 |  |  |  |  | 0.866358 |
| 63 | 53.894 | 129 |  | 118.067 |  |  |  |  | 0.866358 |
| 64 | 56.546 | 133.8 | 3.399 | 126.156 |  | 0.00064 |  |  | 0.85043 |
| 65 | 37.779 | 100 | 1.195 | 87.04 |  | 0.00064 |  |  | 0.85043 |
| 66 | 36.349 | 97.43 | 1.182 | 81.925 |  |  |  |  | 2.77982 |
| 67 | 30.793 | 87.43 | 0.8427 | 70.262 |  |  |  |  | 2.77982 |
| 69 | 56.546 | 133.8 | 3.399 | 126.156 |  |  |  |  | 4.308379 |
| 70 | 56.111 | 133 | 3.378 | 124.802 |  | 0.00064 |  |  | 5.174736 |
| 71 | 61.111 | 142 | 4.368 | 135.258 |  |  |  |  | 5.174736 |
| 72 | 56.546 | 133.8 | 3.399 | 126.156 |  |  |  |  | 5.158809 |

LIQUID DESICCANT CHILLER

BACKGROUND OF THE INVENTION

In order to maintain air-conditioned spaces at comfortable and healthy conditions, it is necessary to dry the supply air to about 57° F. wet bulb. It is also desirable to have the supply air dry bulb temperature at least about 5° F. warmer (62° F. or higher). This air feels more comfortable, and also avoids moisture-saturated conditions in the supply duct.

Conventionally the air drying is done with 44° F. chilled water, supplied from electric powered mechanical vapor compression chillers. Those chillers create an unacceptably high and costly peak summer electric demand in many areas. When the air reheat is done with external heat input, the chilling demand is increased by the amount of reheat—a very wasteful practice.

The drying and cooling of the air could alternatively be done with a heat-activated liquid desiccant cycle. Those cycles are proven and effective in drying air (leaving it warmer and dryer). However their performance degrades markedly as they are pushed to conditions where the air is also cooled, e.g. to the 62° F. DB/57° F. WB supply air condition cited above, coupled with a realistic heat rejection temperature, e.g. 83° F. cooling water. The required regeneration temperature goes up, cycle losses magnify, and COP goes down, thus requiring more input heat at higher temperature.

Liquid desiccant drying systems are well established. Commercial vendors include Munters, Drykor, Kathabar, and Niagara Blower (the latter having just acquired Kathabar). The desiccant drying process leaves the air dryer but hotter.

There have been many efforts to use liquid desiccants as coolers vs. only drying. This entails cooling the dried air at least back to room temperature, and preferably below room temperature. Gommed and Grossman (2008) report performance of a system with adiabatic drying and cooling the desiccant with cooling water. It provides very good dehumidification but very limited cooling—cooling COPs range from 0.23 to 0.74.

Liu et al (2006) report performance of a system with diabatic drying followed by evaporative cooling (also referred to as adiabatic humidification). They achieve a cooling COP of 0.61 at 80° C. regeneration temperature when using 15° C. cooling water for heat rejection. Lowenstein et al (2005) report on the transport properties of a low flow diabatic absorber that is directly evaporatively cooled. Jones (2008) reports performance of that low flow unit—a cooling COP of 0.52 at 78° C. regeneration temperature when using 23° C. cooling water.

Numerous researchers have studied and reported upon the combination of a heat pump with a desiccant cooling cycle such that the cold end of the heat pump chills the dried air, and the hot end supplies the regeneration heat. This can be done with either a mechanical compression chiller or an absorption chiller. One example of this type of hybrid system using a mechanical chiller is found in Peterson et al (U.S. Pat. No. 4,941,324).

Wilkinson (U.S. Pat. No. 5,070,703) reports study results on a hybrid of a closed cycle LiBr absorption chiller and an open cycle liquid LiBr desiccant system, wherein both condenser heat and absorber heat from the absorption chiller are supplied to the desiccant regeneration process. The desiccant section of the hybrid cycle incorporates diabatic dehumidification followed by chilling of the ventilation air.

Schinner and Radermacher (1999) also report study results for an integrated absorption chiller/desiccant hybrid cycle. In their case it is a single effect ammonia-water absorption chiller. They model a "triple effect" cycle, i.e. with both condenser and absorber heat supplied to the regeneration process. The ventilation air is adiabatically dried in a desiccant wheel, then cooled by heat exchange with outdoor air, and finally evaporatively cooled. They report calculated COPs above 1.0, but only at return air temperatures higher than desired (above 60° F. wet bulb). The calculated absorption cycle COP is 0.293, and the absorber temperature is 192° F., inferring a driving heat temperature above 300° F.

What is needed is an air conditioning cycle that can be powered by low temperature waste heat or solar heat, that has high COP, and that has low parasitic power demand to run fans and pumps.

DISCLOSURE OF INVENTION

The approach to achieving higher Coefficient of Performance (1.25) air conditioning at standard conditions from lower temperature driving heat (245° F.) is as follows. A thermally integrated hybrid absorption/desiccant system is provided that is comprised of both a liquid desiccant drying cycle and a closed absorption cycle chiller. Each of the constituent cycles will pick up about half of the total chilling duty. Reject heat from the absorption cycle will be used as regeneration heat for the desiccant cycle. With this combination, three important benefits are obtained:

- Since the absorption cycle only supplies sensible cooling and no moisture removal, it operates at higher evaporator chilling temperature than normal (e.g. 55° F. vs 40° F.), which reduces its required generator temperature.
- Since the desiccant cycle only supplies about half the total equivalent chilling, and none of the colder portion of the chilling, it requires a much lower degree of drying of the ventilation air, compared to when it supplies all the chilling. This means that its regeneration temperature is much lower (typically 135° F. at the above design condition).
- The absorption cycle absorber rejects heat at about 160° F., which is hot enough to supply the desiccant regenerator. Hence the desiccant cycle COP (typically 0.55) adds to the absorption cycle COP (typically 0.7) without requiring any additional input heat. The resulting 1.25 COP is obtained from a 245° F. heat input—much lower than the driving temperature required by any existing thermally activated chilling apparatus performing to a comparable COP. This allows use of less expensive solar thermal heat, and/or more readily available waste heat.

One key feature of this thermally integrated combination is that the desiccant cycle reject heat is rejected to ambient, not to the chilling coil (which is chilled by the absorption cycle evaporator). The net improvement in overall cycle COP is directly a function of how much of the desiccant cycle reject heat goes to ambient, versus into the chilling coil. The disclosed cycle has three features that ensure that the amount of dryer heat rejected to ambient is maximized. Those features are: the front-end adiabatic humidifier; the air to air heat exchanger, and the cooled drier (cooled either via recirculated liquid desiccant or via diabatic contact). Another key feature, necessary to achieve reasonably interesting values of COP, is the regeneration air-to-air heat exchanger. That feature, in combination with the heated regenerator, ensures that as much as possible of the regeneration heat goes into desiccant regeneration, as opposed to simply heating the regeneration air.

Whereas FIGS. 1 through 4 all depict use of adiabatic contactors in the desiccant cycles, it is also possible to use non-adiabatic ("diabatic") contactors.

Figure 2:
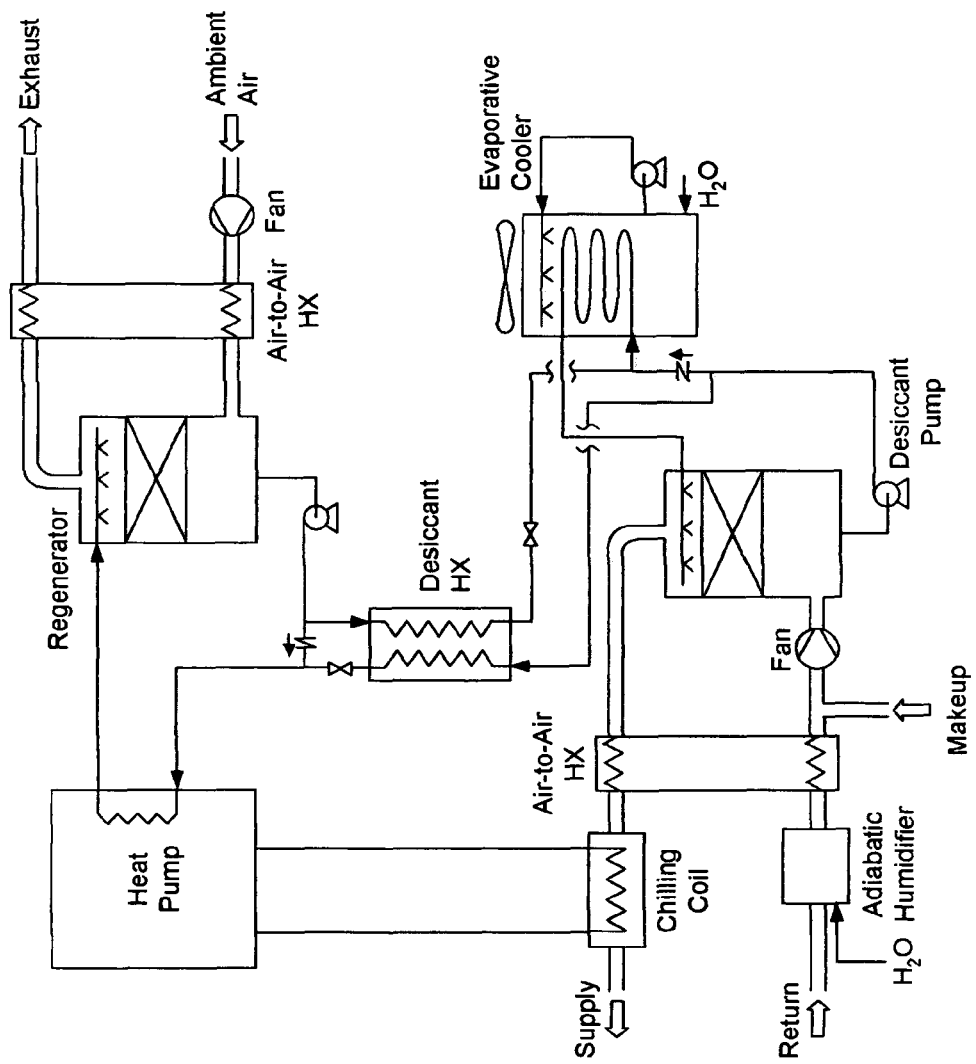
FIG. 2 modifies the FIG. 1 flowsheet so as to have a chilling coil at the back end, in lieu of the second adiabatic humidifier, and also depicts a generic heat pump supplying chilling to the chilling coil and regeneration heat to the desiccant heater. Also, the makeup air tie-in is moved to downstream of the air-to-air heat exchanger (although that change has little impact).
Figure 3:
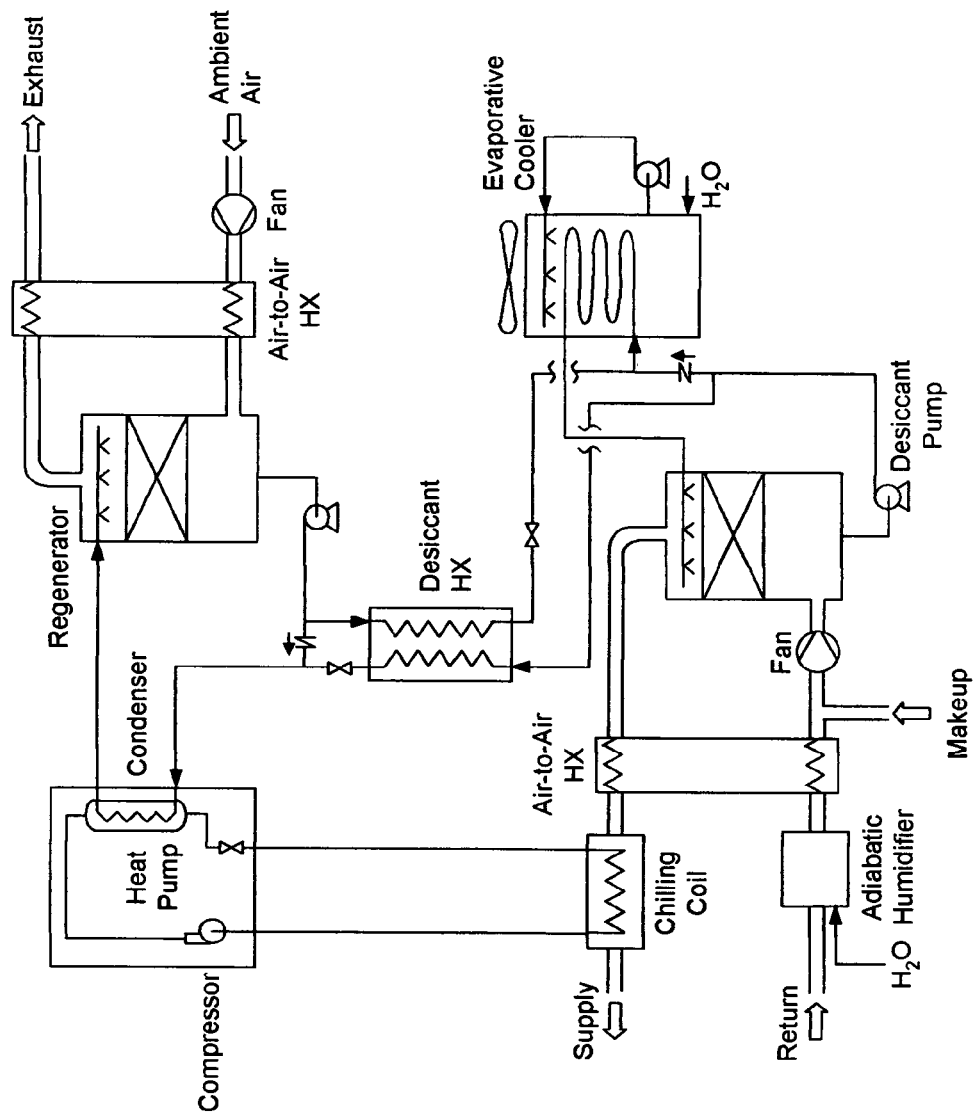
FIG. 3 presents one specific example of the FIG. 2 generic flowsheet, wherein the heat pump is a mechanical vapor compression type. This combination only requires about 60% as much electricity as a conventional electric chiller, since the desiccant section picks up nearly half of the total cooling duty. Note another advantage—that no separate cooling circuit is required for the mechanical compression section.
Figure 5:
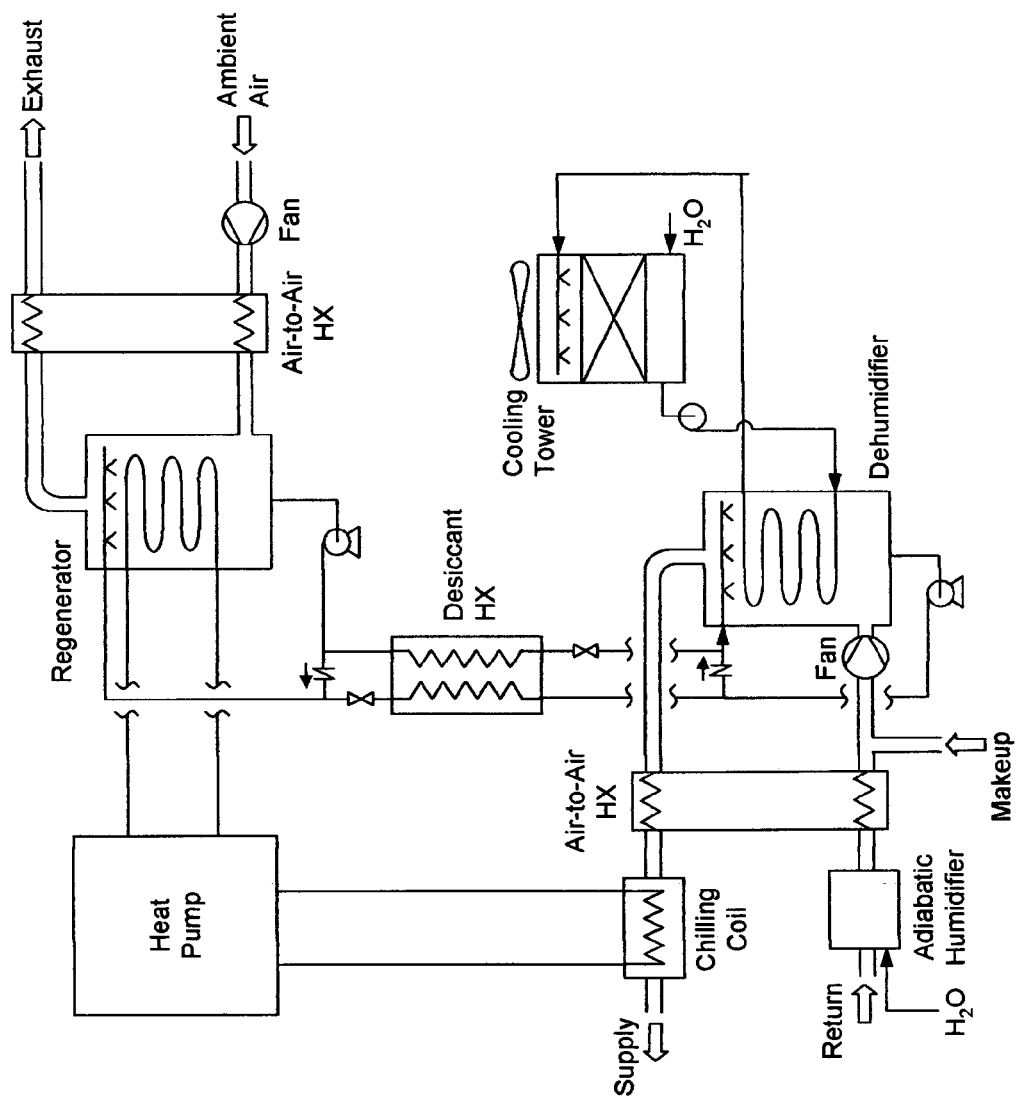

FIG. 5 depicts a modification of the FIG. 2 flowsheet such that both contactors are diabatic.

Figure 6:
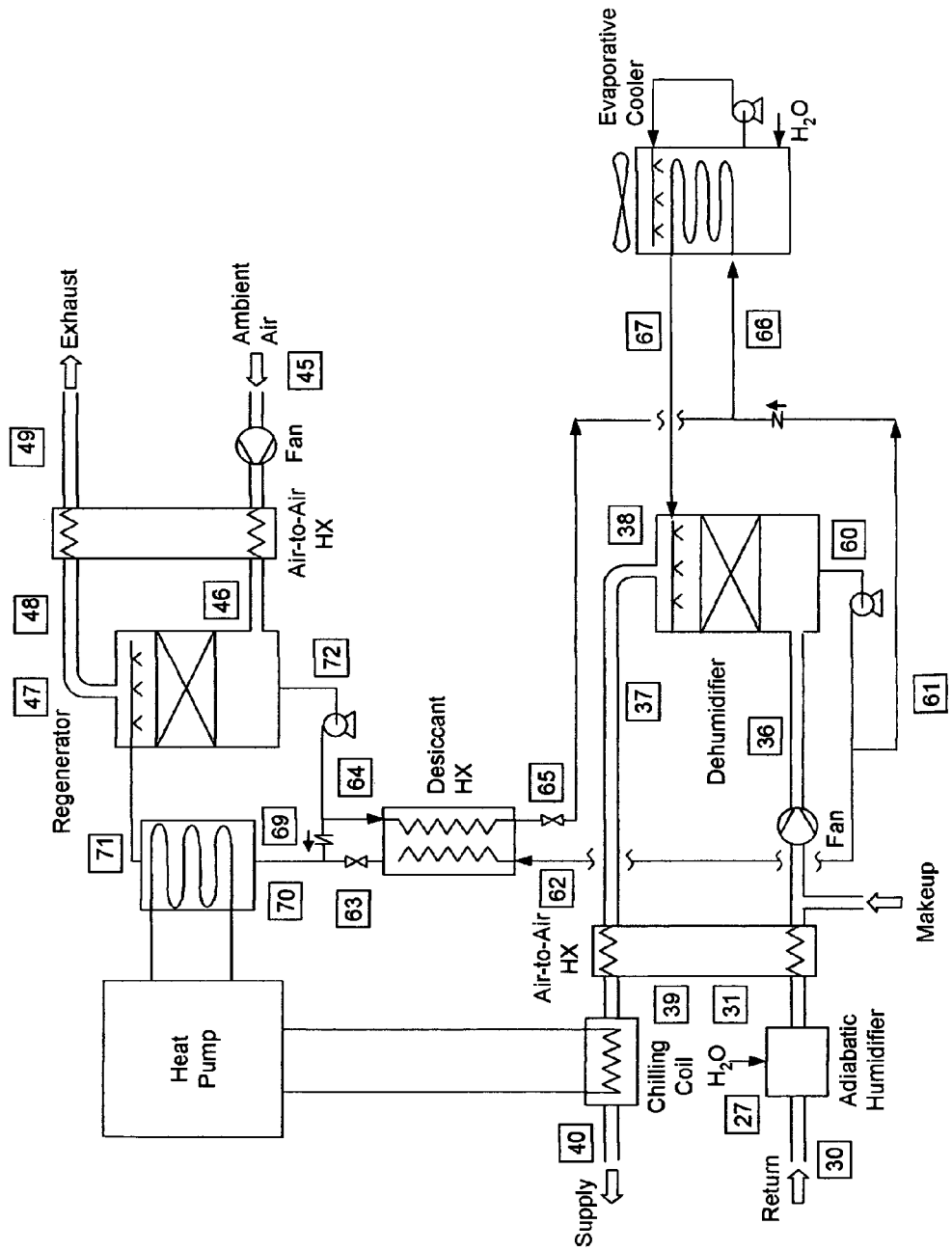

FIG. 6 presents the FIG. 2 flowsheet with the addition of statepoints for thermodynamic properties, and the table in FIG. 7 depicts those properties at each statepoint.

Figure 4:
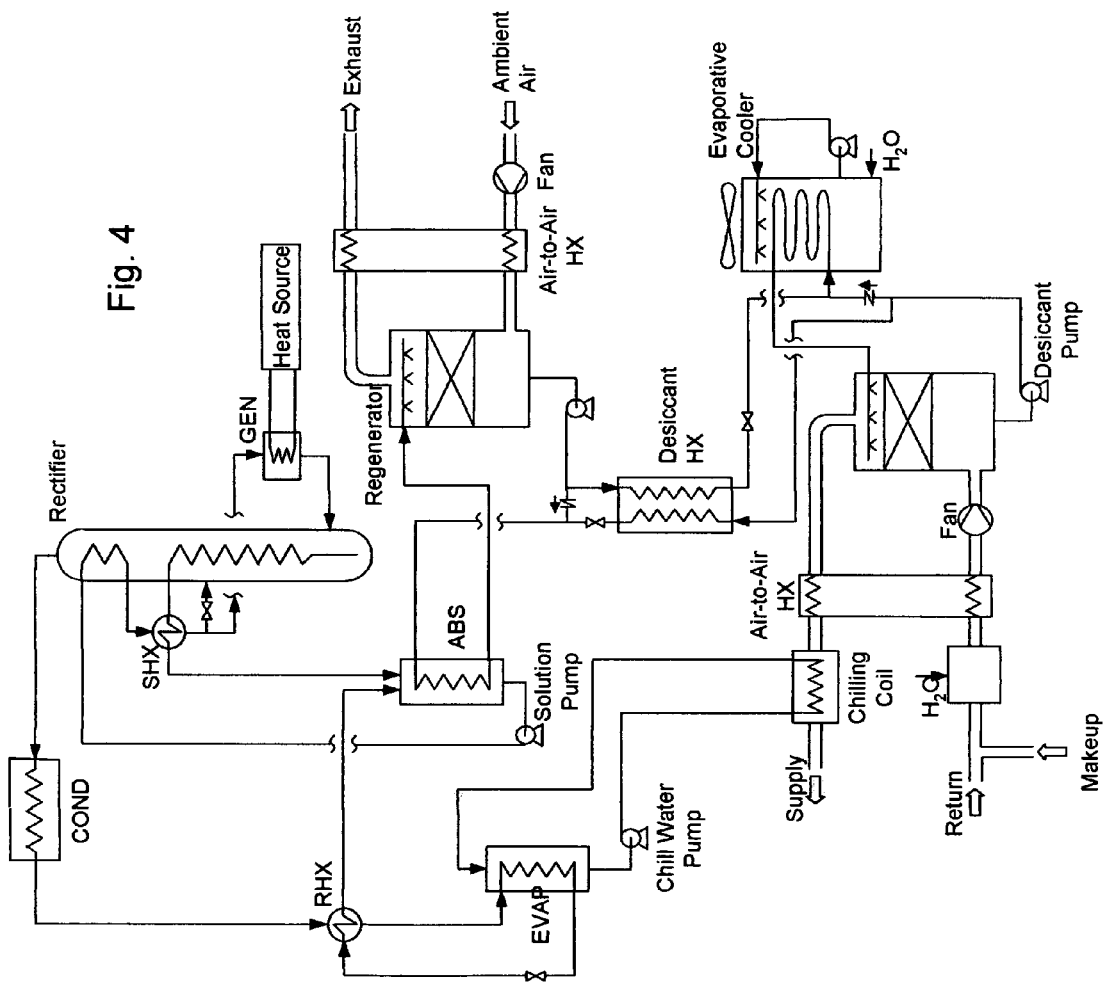
FIG. 4 presents another embodiment of the FIG. 2 flowsheet, wherein the heat pump is an ammonia-water absorption heat pump. A single low temperature heat source, that can be at a temperature less than about 250° F., powers the entire cooler system, by first powering the generator (desorber) of the absorption cycle. Reject heat from the absorber of the absorption cycle then heats the regeneration desiccant. The evaporator of the absorption cycle provides chilled water for the air-chilling coil. Heat is rejected to ambient from the adiabatic dryer, preferably to an evaporative cooler via the liquid desiccant recirculation loop. Heat is also rejected to ambient from the condenser of the absorption cycle, preferably using the same evaporative cooler.
Figure 8:
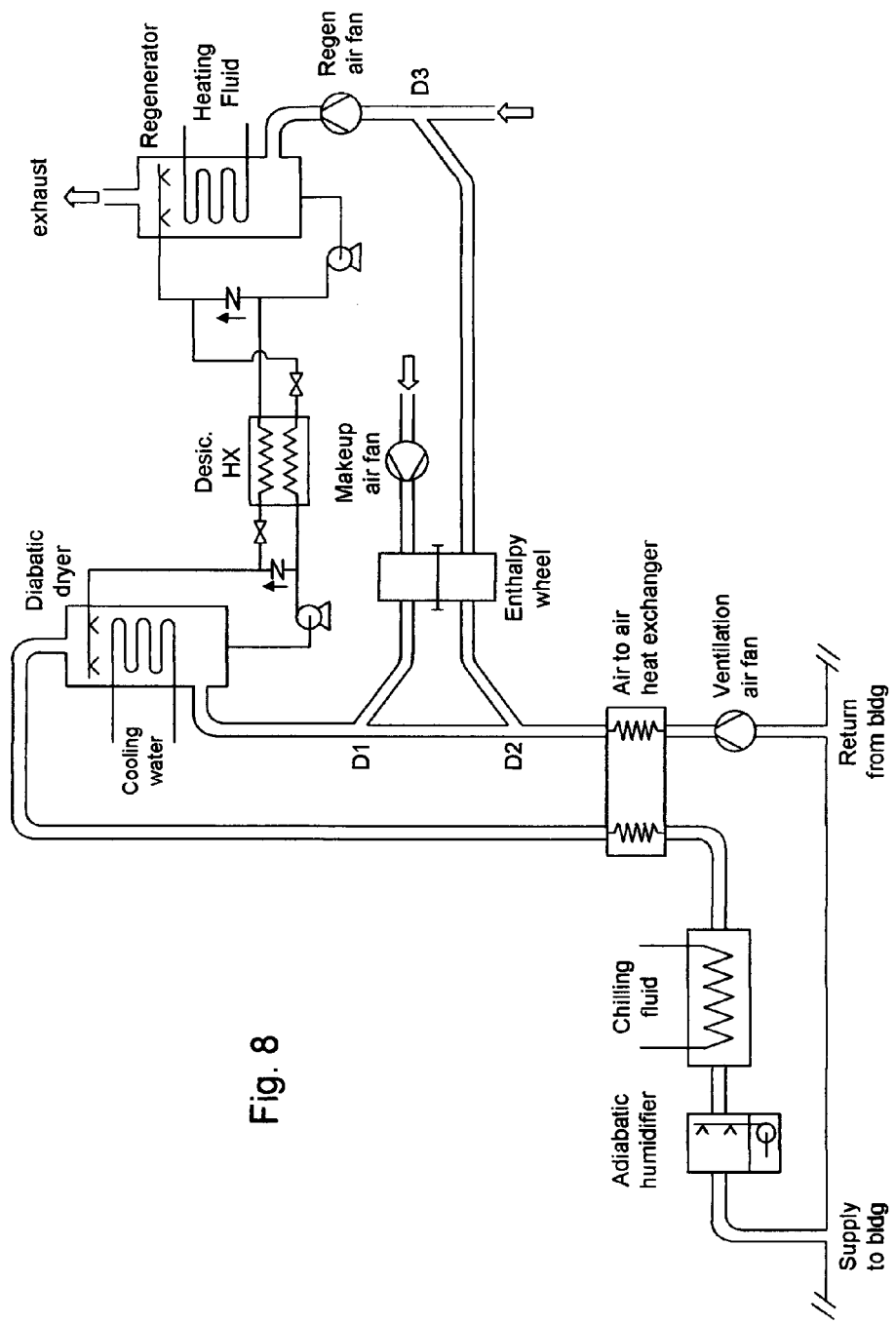

FIG. 8 presents a version of the FIG. 4 flowsheet with diabatic contactors, and

Figure 9:
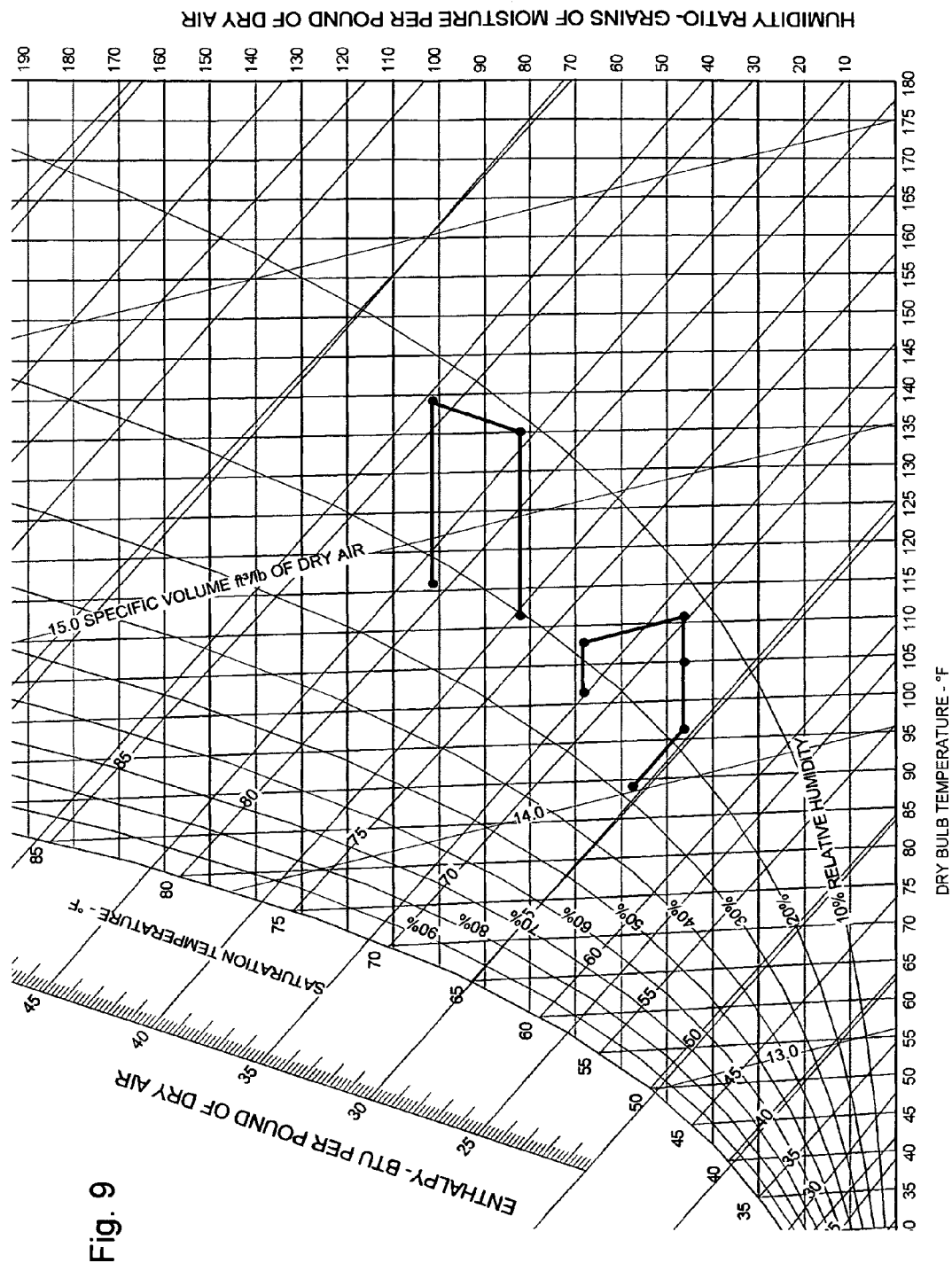

FIG. 9 presents example conditions of the ventilation air and regeneration air as it flows through the FIG. 8 flowsheet, as depicted on a psychrometric chart. Note also that this version of the flowsheet has the adiabatic humidifier at the back end of the cycle.

Figure 10:
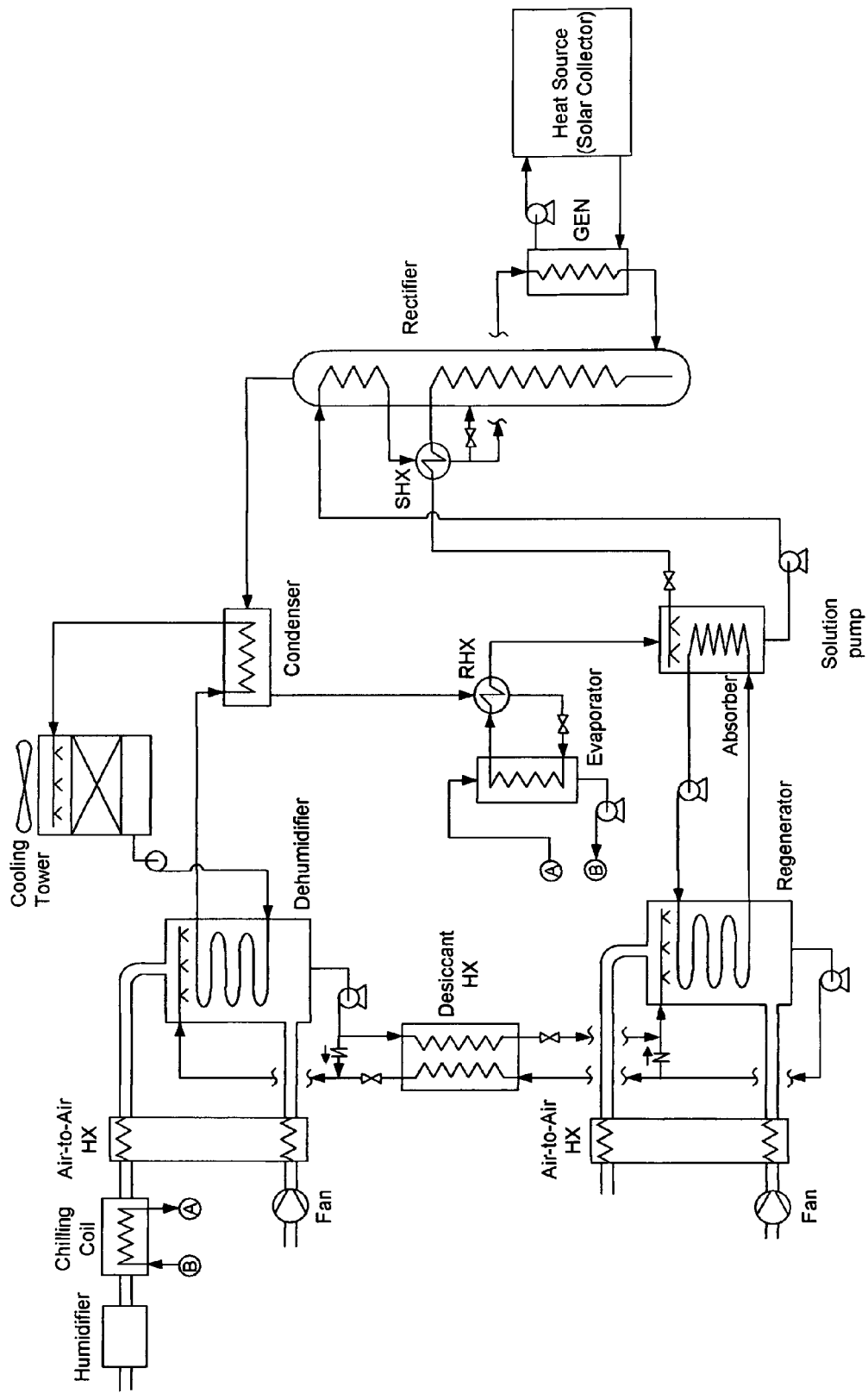
Figure 11:
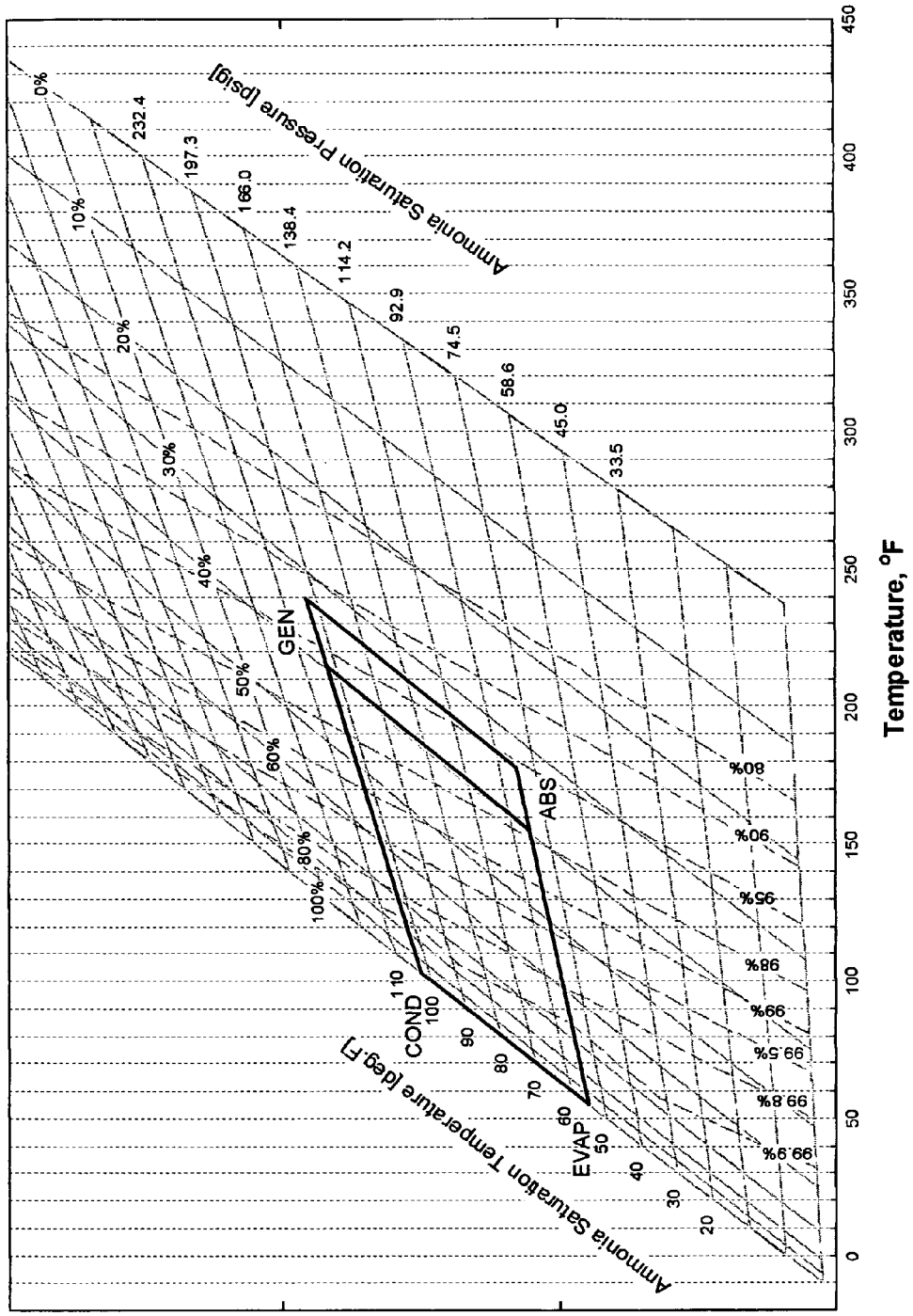

FIG. 10 presents a version of the FIG. 4 flowsheet with diabatic contactors, and FIG. 11 presents example thermodynamic properties in the ammonia-water absorption cycle corresponding to the FIG. 10 flowsheet, as depicted on a vapor-liquid equilibrium diagram for the ammonia-water working pair. Note that the generator heat input spans the temperature range from 238° F. to 213° F., and the absorber heat rejection is from 156° F. to 177° F. The evaporator is at 55° F., and the condenser is at 102° F.

BEST MODE

The component parts of each flowsheet are identified on the figures. Prior art disclosures are recited below. Each of the flowsheets exhibits the unique disclosed features that enable increased performance over the prior art results.

This invention builds upon the capabilities of ammonia water absorption heat pumps currently being demonstrated by Energy Concepts Co. Those heat pumps produce 155° F. hot water from 175° F. absorber and 120° F. condenser, while chilling on the cold side to 34° F. That is done at high performance (COP of 0.6) and with 330° F. driving temperature. In the absorber-coupled integrated absorption/desiccant system, the absorption cycle operates at much more benign conditions, and hence should have even higher performance at lower driving temperature. The various liquid desiccant cycles that could be regenerated by low temperature heat were surveyed. It was discovered that the systems using desiccant wheels could not operate acceptably at the desired low regeneration temperature, and hence non-adiabatic ("diabatic") desiccant contactors were needed. It was further discovered that air-to-air heat exchangers were vitally important, as otherwise much of the applied energy ended up as wasteful heating of the air, instead of the desired cooling and drying of the air. Those air-to-air exchangers can be either the stationary type or the rotary type.

When even those features did not yield the desired performance from the liquid desiccant cycle, it was further discovered that it was necessary to incorporate an adiabatic humidifier in the cycle. The best location for that component is at the start of the ventilation air treating sequence, although satisfactory results can also be obtained when it is at the end of the sequence.

The above development sequence resulted in the FIG. 8 and FIG. 10 flowsheets. The accompanying thermodynamic diagrams show that those cycles are capable of producing the desired performance. There was however one drawback to that configuration. The diabatic contactors are not standard commercial items available at various sizes, and hence would require some development. Hence an alternative configuration was investigated. In particular, standard adiabatic contactors were explored. Taken alone, these contactors have the same drawbacks as the (adiabatic) desiccant wheel—the required regeneration temperature is too high for a practical integrated cycle. However it was discovered that with heavy recirculation of the liquid desiccant through a heat exchanger and then sprayed back into the contactor, the performance of the adiabatic contactor could be made to approach that of the diabatic contactor. The result of that investigation sequence is the FIG. 4 flowsheet, where the contactors are changed to adiabatic. FIGS. 6 and 7 depict the thermodynamic operating conditions of this configuration that demonstrate that the desired performance is indeed feasible. The dryer operates between 87.3° F. and 96.2° F., and hence can indeed be cooled by ambient at 75° F. wet bulb. The regenerator operates between 140° F. and 131.7° F., and hence can indeed be heated by the absorption cycle absorber. The chilling coil only needs to cool the air to 65° F., since it has already been dried to 57° F. wet bulb. The desiccant flow rates are very reasonable when either LiCl or LiBr is used as the desiccant (or mixtures thereof). TEG or other known liquid desiccants could also be used. However those other desiccants would require somewhat higher regeneration temperatures to keep the desiccant flow rates reasonable, since their moisture carrying capacity is so much lower.

When properly operated, this integrated cooling system has a relatively fixed ratio between the moisture removed by the dryer and the sensible chilling delivered by the absorption cycle. However conditioned spaces have widely varying sensible heat ratios, depending upon the moisture emitting processes in the space and also the amount of outside makeup air. The integrated system accommodates those varying sensible heat ratios with the adiabatic humidifier. Any moisture introduced into the front-end humidifier has the effect of increasing the moisture removal duty and decreasing the sensible chilling duty. Hence that is done until the two are brought into their natural balance point. With the wetted media type of humidifier, the amount of moisture added to the air can be controlled by simply bypassing part of the air around the media with a damper. With the spray mist type of humidifier, the water flowrate to the spray-misters is controlled.

The integrated absorption/desiccant cooler can use other types of absorption cycle than the ammonia-water cycle. In particular, it can also make use of the LiBr absorption cycle. In that case however, it is not possible to use reject heat from the absorber to power the desiccant regeneration step. The LiBr absorbent would be in its crystallization region at that temperature. Instead, the condenser heat must be used. The steam condensing temperature in the cycle is elevated from its normal 105° F. to about 150° F., to heat the liquid desiccant. Since condenser heat is typically only about ⅔ the magnitude of absorber heat, this combination will not realize as much gain from the desiccant section, and hence the overall cycle COP will be lower. However the advantage is that it eliminates use of ammonia. In some applications ammonia is deemed too risky due to its toxicity.

Similarly the disclosed integration of a heat pump and a liquid desiccant cycle can be done with a mechanical compression heat pump. In that instance the combination is powered by electricity rather than by low temperature heat. This would be used where no heat is available. It has the advantage that the electric requirement is reduced by 40% below what is possible with any conventional electric chiller.

Figure 1:
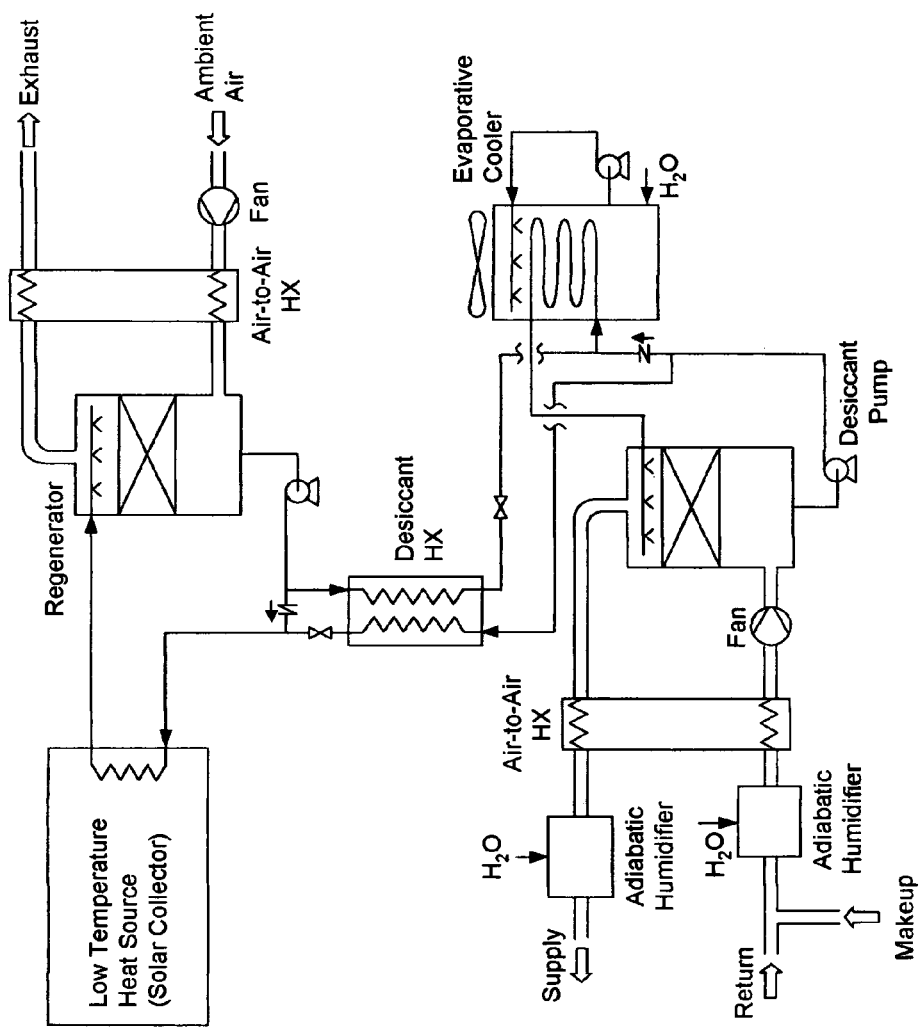
FIG. 1 is a simplified schematic flowsheet of a stand-alone liquid desiccant cooling system, with recirculating adiabatic contactors for both the drying section and the regeneration section, and with dual adiabatic humidifiers (one at the front (return air) end, and one at the back (supply air) end). Makeup (outside) air is shown being introduced at the front end.

The disclosed novel liquid desiccant cooling cycle has been discovered to have two other beneficial applications, independent of being in the above-disclosed integrated combination. First is as a stand-alone cycle, as depicted in FIG. 1. In compensation for no longer having the help of the chilling coil at the cold end, two adjustments are necessary. First, a second adiabatic humidifier is required (one at either end), and secondly, the dryer must dry the air substantially more. The extra dryness allows the back end humidifier to achieve the desired low dry bulb temperature, however it means that higher regeneration temperatures are required.

The other beneficial application is to provide a hybrid of the desiccant cycle and a chiller wherein they are not integrated, yet they both cooperate to cool and dry the air. With an electric chiller, the same 40% (or more) savings in electricity is realized, but a separate source of regeneration heat is required. However it can be at very low temperature (150 F), i.e. can be waste heat or low cost solar heat. When the chiller is heat activated, it only requires driving temperature of about 175 F, and that combined with the 150 F requirement of the desiccant cycle can be very advantageous, even though the overall COP is only about 0.65.

REFERENCES

Gommed, Khaled and Grossman, Gershon. Sep. 23, 2008. "Experimental Investigation of a Solar-Powered Open Absorption System for Cooling, Dehumidification and Air Conditioning." International Sorption Heat Pump Conference. Seoul, Korea.

Howell, John R. and Peng, Patrick. Feb. 15, 1983. "Hybrid Double-Absorption Cooling System." U.S. Pat. No. 4,373, 347.

Jones, Benjamin Marcus. September 2008. "Field Evaluation and Anaysis of a Liquid Desiccant Air Handling System." Queen's University. Kingston, Ontario, Canada.

Kelley, G. A. Dec. 24, 1968. "Method and Means for Providing High Humidity, Low Temperature Air to a Space." U.S. Pat. No. 3,417,574.

Ko, Suk M. Jun. 3, 1980. "LiCl Dehumidifier LiBr Absorption Chiller Hybrid Air Conditioning System with Energy Recovery." U.S. Pat. No. 4,205,529.

Liu, Jianhua; et al, 2006. "Experimental Investigation on the Operation Performance of a Liquid Desiccant Air-Conditioning System." *HVAC Technologies for Energy Efficiency*, Volume IV-11-5.

Lowenstein, Andrew; et al. Jun. 22, 2005. "A Low-Flow, Zero Carryover Liquid Desiccant Conditioner." International Sorption Heat Pump Conference. Denver, Colo.

Lowenstein, Andrew. March 2003. "A Solar Liquid-Desiccant Air Conditioner." *Solar LDAC*.

Lowenstein, Ph.D, Andrew and Novosel, Davor. 1995. "The Seasonal Performance of a Liquid-Desiccant Air Conditioner." *ASHRAE Technical Data Bulletin*, Volume II, Number 2.

Maeda, Kensaku. Oct. 19, 1999. "Heat Pump Device and Desiccant Assisted Air Conditioning System." U.S. Pat. No. 5,966,955.

Meckler, Gershon and Meckler, Milton. Oct. 23, 1979. "Air Conditioning Apparatus." U.S. Pat. No. 4,171,624.

Pesaran, Ph.D. Ahmad; et al, 1995. "Evaluation of a Liquid Desiccant-Enhanced Heat Pipe Air Preconditioner." *ASHRAE Technical Data Bulletin*, Volume II, Number 2.

Peterson, John L.; et al, Jul. 17, 1990. "Hybrid Vapor-Compression/Liquid Desiccant Air Conditioner." U.S. Pat. No. 4,941,324.

Potnis, Shailesh V.; et al, Apr. 17, 2001. "Liquid Desiccant Air Conditioner." U.S. Pat. No. 6,216,483.

Schinner, Jr., P. E., Edward N. January 1999. "Performance Analysis of a Combined Desiccant/Absorption Air-Conditioning System." *HVAC & R Research*, Volume 5, Number 1.

Wilkinson, P. E., W. H. 1991. "A Simplified, High-Efficiency Dublsorb System." *ASHRAE Transactions: Symposia*, NY-91-2-1.

Wilkinson, P. E., W. H. 1991. "Evaporative Cooling Trade-Offs in Liquid Desiccant Systems." *ASHRAE Transactions: Symposia*, NY-91-8-2. Pages 642-649.

Wilkinson, William H. Dec. 10, 1991. "Hybird Air Conditioning System Integration." U.S. Pat. No. 5,070,703.

The invention claimed is:

1. A heat-pumped liquid desiccant cooling system for drying and cooling air comprised of:
   a. A liquid desiccant air dryer;
   b. an air-to-air heat exchanger for warming the air to and cooling the air from said dryer;
   c. an adiabatic humidifier for cooling the air prior to being heated in said heat exchanger;
   d. a desiccant circulating pump and desiccant cooler for said dryer;
   e. a chilling coil after said heat exchanger for chilling the dried and cooled air;
   f. a regenerator for removing moisture from the liquid desiccant;
   g. a desiccant circulating pump and desiccant heater for said regenerator;
   h. an air-to-air heat exchanger for heating regeneration air to and cooling exhaust air from said regenerator; and
   i. a heat pump for supplying heat to said desiccant heater and chilling to said chilling coil.

2. The cooling system according to claim 1 wherein said heat pump is a mechanical vapor compression heat pump.

3. The cooling system according to claim 1 wherein said heat pump is a thermally activated heat pump.

4. The cooling system according to claim 3 wherein said heat pump is an ammonia-water absorption heat pump, comprised of an absorber that supplies heat to said heater, and an evaporator that supplies chilling to said chilling coil.

5. The cooling system according to claim 4 wherein the condenser of said absorption heat pump also supplies heat to said regenerator.

6. The cooling system according to claim 3 wherein said heat pump is a LiBr absorption heat pump comprised of a condenser that supplies heat to said heater.

7. A liquid desiccant cooling system for drying and cooling air comprised of:
   a. A liquid desiccant air dryer;
   b. An air-to-air heat exchanger for warming the air to and cooling the air from said dryer;
   c. an adiabatic humidifier for cooling the air prior to being heated in said heat exchanger;
   d. a desiccant circulating pump and desiccant cooler for said dryer;
   e. at least one of an adiabatic humidifier and a chilling coil after said heat exchanger for chilling the dried and cooled air;
   f. a regenerator for removing moisture from the liquid desiccant;
   g. a desiccant circulating pump and desiccant heater for said regenerator; and
   h. an air-to-air heat exchanger for heating regeneration air to and cooling exhaust air from said regenerator.

8. The cooling system according to claim 7 additionally comprised of an adiabatic humidifier after said heat exchanger plus a source of low temperature heat for said desiccant heater.

9. The cooling system according to claim 7 additionally comprised of a chilling coil for the dried and cooled air after said heat exchanger.

10. The cooling system according to claim 9 wherein said chilling coil is supplied chilling from a mechanical compression chiller.

11. The cooling system according to claim 10 wherein a condenser of said mechanical compression chiller supplies heat to said desiccant heater.

12. The cooling system according to claim 9 wherein said chilling coil is supplied chilling from a heat-activated absorption chiller.

13. The cooling system according to claim 12 additionally comprised of an absorber for said absorption chiller that supplies heat to said desiccant heater (or is said heater).

14. The cooling system according to claim 7 additionally comprised of a cooling heat exchange coil inside said dryer.

15. The cooling system according to claim 7 additionally comprised of a desiccant heat exchanger for the desiccant flow streams between said dryer circulating pump and said regenerator circulating pump.

16. The cooling system according to claim 15 additionally comprising desiccant recirculation flowpaths in each desiccant circuit.

17. A liquid desiccant cooling system for cooling and drying air comprised of:
   a. an adiabatic humidifier;
   b. an air to air heat exchanger for cooling the humidified air;
   c. a non-adiabatic liquid desiccant dryer for said cooled air, including a means for supplying cooling to said dryer;
   d. a second adiabatic humidifier for evaporatively cooling the dried air after it has been cooled in the air to air heat exchanger; and
   e. a non-adiabatic regenerator for removing moisture from the liquid desiccant.

18. A heat pumped liquid desiccant cooling system for cooling and drying air comprised of:
   a. an adiabatic humidifier;
   b. an air to air heat exchanger for cooling the humidified air;
   c. a non-adiabatic liquid desiccant dryer for said cooled air, including a means for supplying cooling to said dryer;
   d. a chilling coil for cooling the dried air after it has been cooled in the air to air heat exchanger;
   e. a non-adiabatic regenerator for removing moisture from the liquid desiccant; and
   f. a heat pump for supplying heat to said regenerator and chilling to said chilling coil.

19. The cooling system according to claim 18 additionally comprised of a means for controlling a temperature of the cooled air by controlling the amount of moisture added to the air by said humidifier.

20. The cooling system according to claim 19 additionally comprised of a means for controlling a dryness of the dried air by controlling a temperature of said regenerator.

* * * * *